July 20, 1954

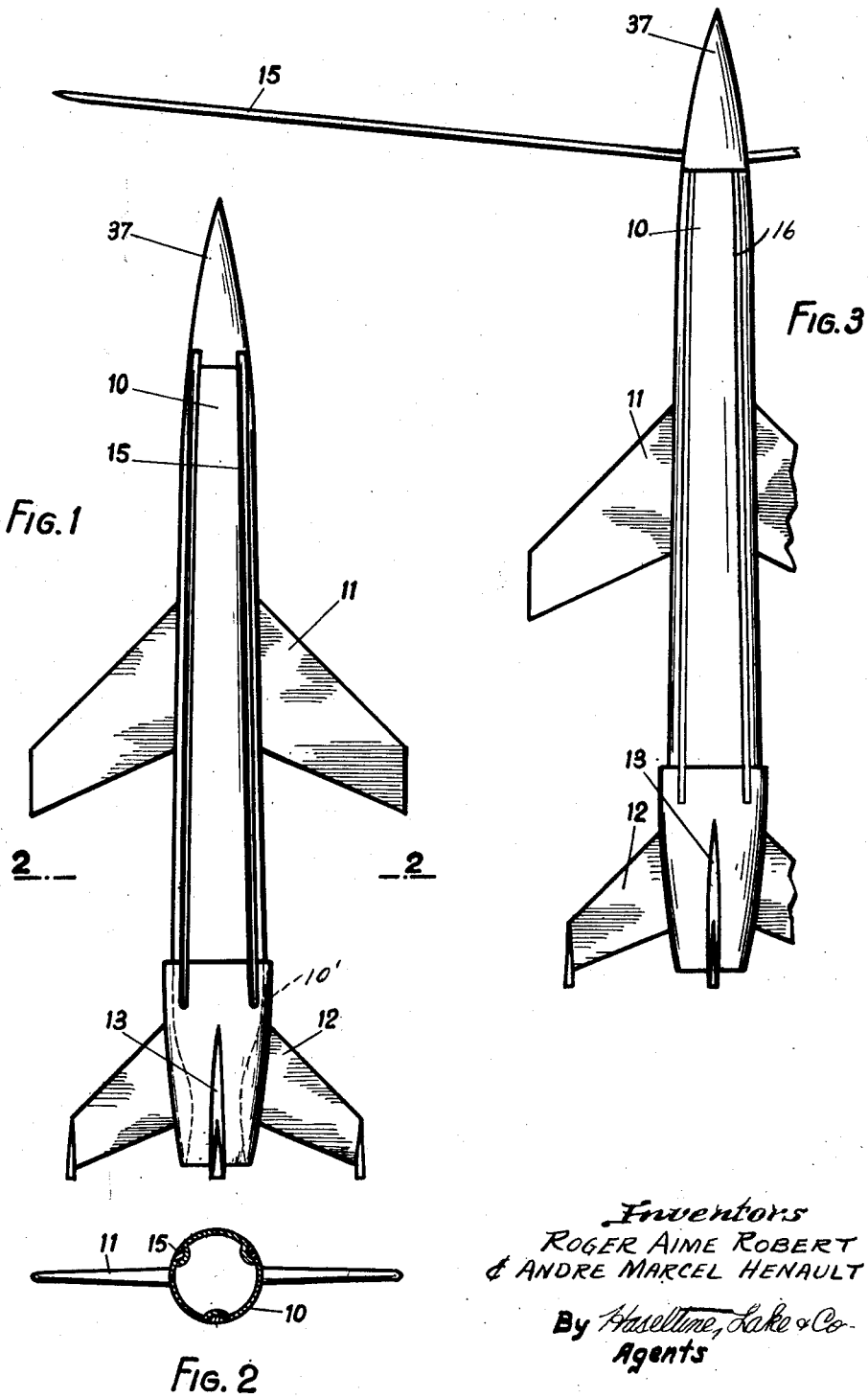

R. A. ROBERT ET AL 2,684,213

MIXED TYPE AIRCRAFT WITH FIXED WING
AND ROTARY WING SUSTAINING MEANS

Filed Aug. 14, 1947

Inventors
ROGER AIME ROBERT
& ANDRE MARCEL HENAULT
By Haseltine, Lake & Co.
Agents

UNITED STATES PATENT OFFICE 2,684,213

MIXED TYPE AIRCRAFT WITH FIXED WING AND ROTARY WING SUSTAINING MEANS

Roger Aimé Robert, Boulogne-sur-Seine, and André Marcel Henault, St. Cloud, France; said Henault assignor to said Robert Application August 14, 1947, Serial No. 768,626

Claims priority, application France September 10, 1946

24 Claims. (Cl. 244—8)

The present invention relates to a rocket-propelled flying machine or aircraft having great horizontal speed and capable of landing vertically at any given point.

Such a flying machine may be used, in particular, for carrying mail over long distances and at high speeds.

The aircraft according to the invention is characterized by the combination of a flying apparatus adapted for high speed horizontal flight with a rotary wing which is retracted during high-speed flight and whose axis of rotation is directed along the longitudinal axis of the aircraft, this wing allowing substantially vertical descent at very low speed upon landing.

The aircraft, as considered in its construction adapted for high-speed horizontal flight, may or may not be provided with sustaining wings; and it may or may not comprise stabilizing control wings arranged, if provided, either in front of or behind the sustaining wings.

It has already been proposed to use a flying apparatus constituted by a high speed plane provided with a rotary wing, whose axis of rotation is perpendicular to the longitudinal axis of the apparatus and the blades of which, in high speed flight, are folded back along the fuselage or are retracted therein.

This apparatus presents the following main drawbacks:

(a) The blades and their attachments are, at the time of their opening, submitted to great strain due to the relative wind especially if, at that time, the speed of the apparatus is great, which is in particular the case for a rocket-propelled machine.

(b) The area of the circle described by the tips of the blades is relatively small because the length of the blades is conditioned by the length of the fuselage of the apparatus and by the position of the axis of rotation of the rotor, as the latter must necessarily be located in the vicinity of the center of gravity.

(c) The unfolding of the blades, added to the necessity of keeping them away from the surfaces of the control wings during their rotation, creates complications.

In an aircraft according to the invention, since the axis of rotation of the rotor is arranged in the axis, or substantially in the axis, of the fuselage of the apparatus, the blades in their folded position are very readily lodged along the length of the body of the rocket.

The arrangement and the construction of the hub of the rotating wing are likewise very simple as this hub fits perfectly within the nose or forward outline of the fuselage.

In their open position and during their rotation, as the axis of the fuselage is then vertical, the blades have ample clearance with respect to the sustaining wings and the control surfaces, both of which may therefore be designed without having to take this rotor into account.

The rotor can have a maximum diameter since the length of the blades may be substantially equal to the length of the fuselage, while in the known machines mentioned hereabove, this length can be only half the length of the fuselage. In other words, the area swept by the rotor in the machine according to the invention may be four times as great as in a known machine of equal weight.

Finally, on landing, the blades of the machine according to the invention are not submitted to excessive stresses when they are unfolded.

Such an aircraft, when it approaches its destination, is directed, for instance by electromagnetic means, into an upright position, in order to bring it to a vertical climb, its propelling means being then advantageously cut off.

Due to its impetus, the aircraft continues its ascent substantially along a vertical path until its speed is annulled and then reverses. At this instant, that is when its speed is zero, or still rising but very low, or already dropping but very low, the unfolding or spreading of the blades of the rotor is effected. This manoeuver may be directly effected if there is a pilot on board, or through remote control, or automatically.

In any case, the stresses on the blades and their attachments remain very small.

The rotor is preferably caused to windmill by auto-rotation at the time of its spreading. This auto-rotation is caused either by the effect of a suitable incidence of the blades, or by the use of an auxiliary source of power.

Without departing from the scope of the invention, the rotor, instead of being free and operating by auto-rotation, may be driven by a source of power, similarly to the rotor of an helicopter, which makes it possible if desired still more to reduce the speed of the descent, or even to reduce it to zero.

The orientation of the axis of the rotor by inclination of its pivot, or by any other suitable arrangement, as for instance cyclic blade-pitch variation, makes it possible to generate at will an horizontal component which controls the descent of the aircraft along such a trajectory that it may be caused to land at any predetermined point, or at least a point determined with a good accuracy.

In its folded position, each of the blades of the rotor may be lodged in a channel formed along a generatrix of the fuselage, which channel may be covered by a fairing, or sealed by the blade itself.

When the blades present along their length a variation of incidence, they are lodged in channels or the like which, rather than extending along generatrices of the fuselage, extend along helicoidal curves traced on the latter.

In the following description, given as an example, reference is made to the accompanying drawings, in which:

Figure 1 is a view in elevation;

Figure 2 is a section along line 2—2 of Figure 1;

Figure 3 is an elevation showing the aircraft with its rotating wing unfolded during its windmilling fall;

Figure 4:
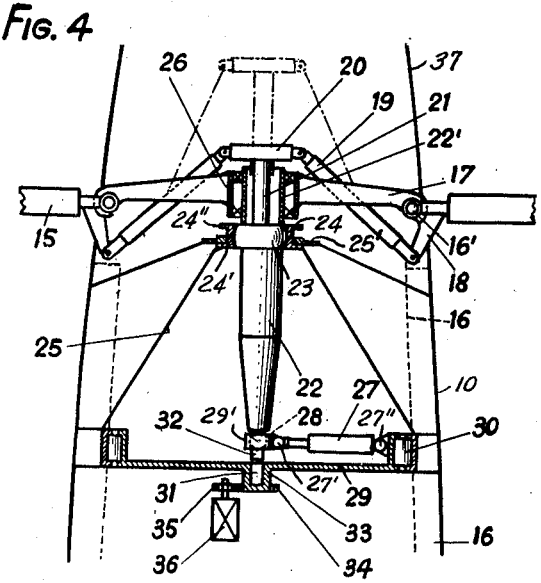
Figure 4 is a view thereof on a larger scale, showing the means of attachment of the rotating wing.

In the embodiment shown in Figures 1 to 5, the aircraft comprises a fuselage 10 on which is fixed a sustaining wing 11. At its rear end, the fuselage carries horizontal control fins 12 and vertical control fins 13. Inside the fuselage is housed an engine 10' which may be a reaction or jet engine. According to the invention, the aircraft further comprises a rotating wing 14, which is retracted in normal flight and is spread out just before the aircraft contacts ground so as to rotate about a longitudinal axis of the craft. This rotating wing is made up of a number of blades 15, three in the embodiment shown in Figures 1 to 5. During flight, the blades 15 are housed in corresponding grooves or channels 16 (Figure 4) provided in the surface of the body of the fuselage 10.

These grooves are disposed according to generatrices of the body of the fuselage as shown in Figure 1. If, however, the blades have an incidence variable along their length, the grooves are of helicoidal form, so as to insure proper housing for the blades and simultaneously to preserve the aerodynamic qualities of the aircraft.

Each blade 15 is rotatably mounted on a pin 16' carried by an arm 17 of the fuselage nose 37, the said nose or fair-shaped portion 37 and the arms 17, three in the example shown, being rigidly secured together by any convenient well-known means, such as angle-irons and bolts, etc. Near their point of pivoting, the blades 15 are each provided with a lateral arm 18 to the free ends of which are pivoted links or connecting rods 19, in turn pivoted at their other ends to a disc 20. Each of the connecting rods 19 is advantageously constituted by a shock-absorbing device. The latter is adjusted in such a way that, when fully extended, it forms a stop limiting the opening of the rotor and preventing hyper-extension of the blades upwards, while permitting the rotation of each blade around the corresponding pin 16'. Thus each blade can assume all the positions of equilibrium resulting from the combined action of the aerodynamic and centrifugal forces.

The disc 20 is carried by the rod 21 of a hydraulic jack 22 provided with universal joint means comprising, for example, a spherical swivel-surface 23. The latter cooperates with the spherical recess of a ring or spherical socket 24 having a cylindrical outer surface with end flanges 24' and 24" and slidable in a complementary ring 25' carried by struts 25 rigid with the fuselage. The body of the jack 22 terminates in an upper tubular extension 22' which forms the pivot or inner race around which the rotating wing 14, comprised of the blades 15, may rotate through the medium of a ball bearing 26. The jack 22 may be subjected at its lower extremity to the action of two control jacks 27 and 28, at right angles to each other. These control jacks are pivoted as shown at 27' for the jack 27 on a ring 29' rigid with the body 22 and also pivoted as shown at 27" at their outer ends to a transverse plate 29, resting on the fuselage 10 through the medium of a roller bearing 30, so as to be capable of rotating about the longitudinal axis of said fuselage, the outer race of the bearing 30 being rigid with the fuselage 10. This plate 29 is formed in its center with a recess 31, the shape of which corresponds to the shape of the lower extremity 32 of the jack 22. The recessed projection 33 of the plate 29, in which is formed this recess, forms the hub of a toothed gear 34 in mesh with the output pinion 35 of a motor 36 carried by the body of the fuselage 10.

During normal flight of the aircraft under the action of its propulsion means 10', the blades 15 are collapsed along the fuselage 10 (Figures 1 and 2) and are retracted within the contour of this fuselage so as to be flush therewith. Under the effect of the drag acting on the nose 37 of the rocket, the nose is applied against the top of the fuselage proper 10, the socket 24 abutting by its flange 24" against the ring 25', which is the position for take-off, where the nose 37, including the blades 15, the arms 17 and the jack 22, rests under gravity on the fuselage proper 10, and the extremity 32 of the jack 22 is in the recess 31, thus maintaining the nose 37 strictly in the longitudinal axis of the fuselage 10 in spite of any transverse stresses which may act thereon. The cooperation of the projection 32 and the recess 31 has for its object to insure a positive alignment of the nose and fuselage during normal operation in opposition to bending stresses applied thereto. The nose and fuselage will thus be retained in positive alignment without resorting to the jacks 27 and 27' which would, in any event, have a certain inherent resilience.

The launching and adjustment of the controls of the aircraft are such as to cause the aircraft to reach the neighborhood of its destination. It is then brought, for instance by remote control, preferably automatic, to immediate proximity of its landing point. The landing manoeuver proper then starts. The rocket is guided so as to reach a point situated substantially vertically above the point where it is to land with its nose turned toward the zenith, at a speed close to zero. For instance, the trajectory of the rocket (Figure 5), which is first substantially horizontal, is deflected upwards (position I), the speed of the rocket diminishing progressively until it becomes substantially zero when it reaches the vertical position (position II). By remote control or automatically, the rotating wing 14 is then unfolded through the action of the jack 22, which draws the disc 20 downwards from the position shown in dotted lines to the position shown in solid lines (Figure 4). During this unfolding or spreading movement, which is braked by the action of the shock absorbers forming the connecting rods 19, neither the rotating wing, nor its attachments are subjected to excessive strain, the speed of the rocket being then substantially nil. Under the action of gravity, the aircraft drops substantially vertically, its fall being slowed down by the rotating wing 14, then in rotation. Due to the length of the blades 15, which is substantially equal to the overall length of the aircraft, the speed of this fall is very low.

The rotating wing may be automatically put into rotation under the effect of a suitable incidence of the blades 15.

In a modification, the rotating wing is put into rotation by means of an auxiliary source of energy.

Figure 5:
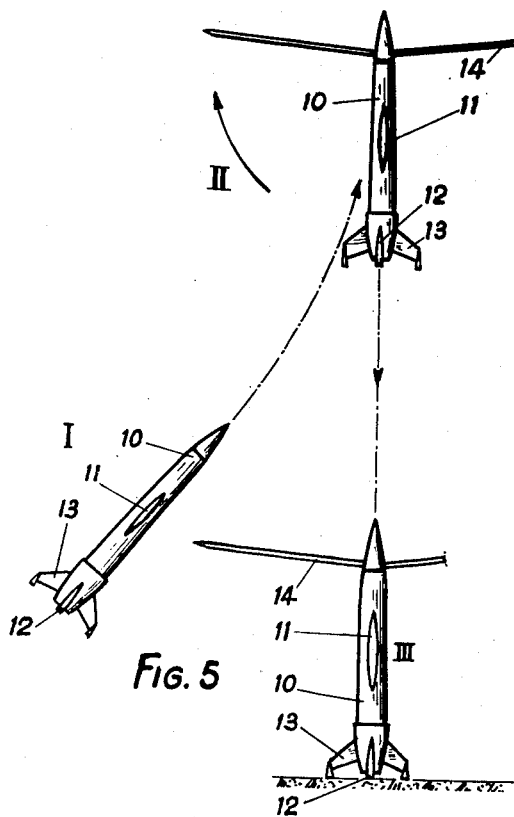
Figure 5 shows the aircraft in various positions during the manoeuver preliminary to landing.

During this fall, the body of fuselage proper 10 hangs from the nose 37 carrying the windmilling rotary wing, and said nose thus tends to be slightly spaced from the fuselage proper 10, as clearly shown Figure 5 in position II, the extremity 32 of the jack 22 being pulled out of the cavity 31; in this movement, the socket 24 slides in the ring 25' until abutment against the flange 24'.

The retarded fall of the aircraft is guided from the ground automatically by remote control or manually from the aircraft so that the aircraft will contact the ground accurately at the desired point, for instance the roof of a post-office (position III).

This guiding is carried out by suitable inclinations of the axis of rotation of the wing 14 relatively to the vertical axis with which the fuselage 10 remains coincident. These inclinations are controlled through the control jacks 27 and 28.

To enable such guiding control to be effected from a remote station outside the aircraft, as for instance from the precise alighting location, the invention provides means, well-known per se, such as those disclosed in United States Patents 2,450,071 and 2,454,022, for controlling at the start of the rocket's fall, the direction of said jacks with respect to a fixed (geographic or magnetic) bearing line at the landing, for instance by bringing the axis of one of said control jacks along said bearing line. These means comprise the motor 36 which is actuated for rotating the plate 29 on the adequate angle.

Figure 6:
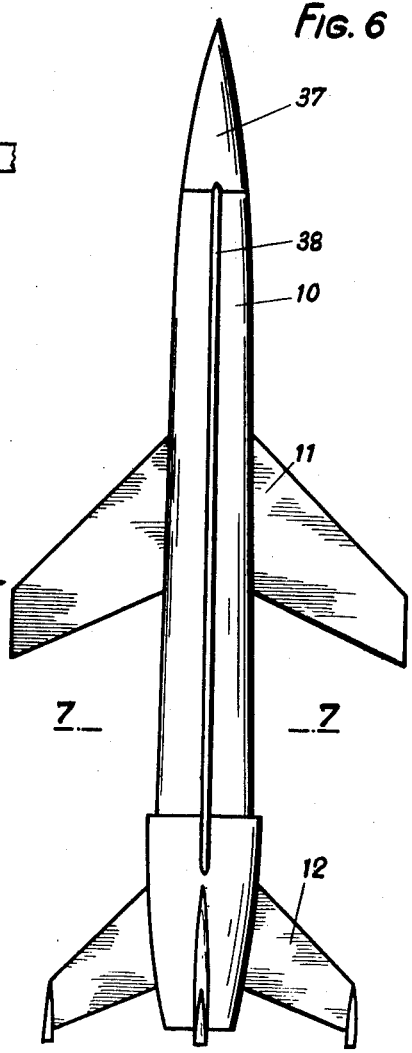
Figure 6 is an elevation of a modification.
Figure 7:
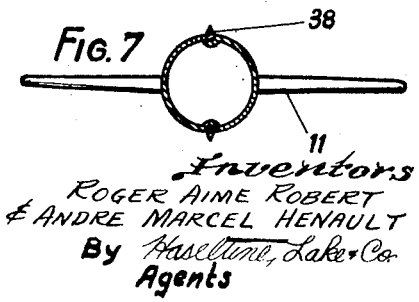
Figure 7 is a section along line 7—7 of Figure 6.

Figures 6 and 7 show a modification according to which the blades 38 of the rotating wing are two in number and, in their collapsed position, are housed edgewise in the body 10 of the fuselage.

We claim:

1. In a flying machine: a forwardly-truncated fuselage, a rotary nose at the forward end of said fuselage having its axis of rotation substantially coincident with the longitudinal axis of said fuselage, a rotary wing supported by said nose, said rotary wing comprising blades long enough to ensure that said machine will descend with its fuselage substantially vertical at a landing speed low enough for a proper landing, and means for retracting said blades by folding said blades down along said fuselage and nose.

2. In a flying machine as in claim 1, channels formed substantially longitudinally along the outer surface of said fuselage to house said blades.

3. In a flying machine as in claim 1, recesses formed substantially longitudinally on the outer surface of said fuselage to house said blades with the outer surfaces of said blades merging substantially flush with the outer surface of said fuselage.

4. A flying machine comprising a fuselage, a longitudinally-extending rotative hub in said fuselage forwardly thereof, means for supporting said hub slidably in said fuselage along a longitudinal direction thereof between a remote position and proximate position, blades forming a rotary wing structure supported on said hub, means for maintaining said blade along said fuselage in retracted condition, means for locking said hub with the axis thereof along the longitudinal axis of said fuselage when said hub is in proximate position, said last-named means being arranged to be disengaged by movement of said hub to the remote position for freeing said hub for transverse movement.

5. A flying machine comprising a forwardly-truncated fuselage, a jack at the front end of said fuselage, said jack having a body, a spherical swivel surface on said jack body, means for supporting said jack body from said fuselage through said spherical swivel surface, a wing structure rotatably mounted on said jack body, said structure including blades, a nose extending from said fuselage at the forward end thereof, means for connecting said blades with said nose for folding retraction of said blades along said fuselage towards the rear end thereof and opening expansion of said blades to form a rotary-wing structure transverse to said fuselage, said connecting means comprising a movable jack-element cooperating with said jack body, and a pivotal linkage between said blades and said movable element.

6. A flying machine as in claim 5 wherein said pivotal linkage comprises damping means.

7. In a flying machine as in claim 5, a transverse plate at the forward end of said fuselage, a central recess in said plate, and a projection at the lower end of said jack for a removable cooperation with said recess.

8. In a flying machine as in claim 5, a transverse plate forwardly of said fuselage, a central recess in said plate, a projection at the bottom end of said jack removably cooperating with said recess, means for rotating said plate around the fuselage axis by a predetermined angle, an angularly adjusting jack between the jack body and said plate, and a further angularly adjusting jack at right angle with the first-mentioned adjusting jack interposed between said jack body and said plate.

9. In a flying machine: a fuselage, a structure mounted at the forward end of said fuselage and rotatable relatively thereto, and a rotary wing carried by said structure transverse to said fuselage and adapted to limit the speed of descent of said machine with its fuselage substantially vertical to a value admitting of a proper landing and comprising blades foldable along said fuselage during horizontal flight of said machine.

10. In a flying machine: a forwardly truncated fuselage, a fin structure on and propulsion means in said fuselage, a rotary section extending forwardly from said fuselage, rotary wing blades on said rotary section, and means for bringing said blades from an operative position transverse to the fuselage longitudinal axis to an inoperative position substantially parallel to said axis and retracted along the fuselage and vice-versa.

11. In a flying machine: a forwardly-truncated fuselage, fin means and propulsion means respectively on and in said fuselage, a rotary nose extending forwardly from said fuselage, rotary wing blades on said nose, means for shifting said blades between an operative position transverse to the fuselage longitudinal axis, in which said blades exert a parachute action, and an inoperative position substantially parallel to said axis in which said blades are retracted along said fuselage, and means for adjusting the longitudinal axis of said nose relatively to said longitudinal axis of said fuselage to control the direction of the parachutal descent of said machine.

12. Flying machine as in claim 11, wherein said nose is mounted for universal swivel movement in a support rigid with said fuselage.

13. Flying machine as in claim 12, including a swivel mounting rigid with said nose and mounted for sliding movement therewith parallel to the longitudinal fuselage axis relatively to a support rigid with said fuselage.

14. Flying machine as in claim 11, wherein said nose is supported by a swivel device mounted for longitudinal sliding movement relatively to the fuselage and slidable to and from a remote first position and a second proximate position relatively to said fuselage, and means for centering said nose relatively to said fuselage in said second position of said nose.

15. A flying machine as in claim 11 wherein said adjusting means comprise a swivel device supporting said nose, and a jack means for controlling the angle of the longitudinal axis of said nose relatively to the longitudinal axis of said fuselage.

16. In a flying machine: an elongated forwardly truncated fuselage, a tailfin structure carried at the rear part of said fuselage, a nose extending forwardly from said fuselage and rotatively mounted with respect to said fuselage, a rotary wing carried by said nose and including blades and means for folding said blades back along the fuselage towards the rear end thereof and for expanding said blades to their operative position transverse to the longitudinal axis of said nose.

17. In a conventional airplane including a fuselage with a sustaining surface and a tail-fin structure, in combination: a nose rotatively mounted on the fuselage forwardly thereof, rotary wing-blades carried by said nose and retractable along said fuselage substantially over the whole length thereof, and means for expanding said blades to constitute a rotary wing structure transverse to said fuselage for parachute descent on landing.

18. Aircraft comprising an elongated fuselage, a tapering nose section supported by said fuselage forwardly thereof for rotation relatively to said fuselage about a substantially longitudinal axis, rotary wing blades supported by said nose section and angularly equi-spaced about said longitudinal axis, and linkage means for retracting said blades along said nose and said fuselage and for expanding said blades transversely of said longitudinal axis.

19. Aircraft as in claim 18 comprising: universal connecting means between said nose and said fuselage, and means for adjusting the angular inclination of the nose axis with respect to the fuselage axis.

20. Aircraft as in claim 18, wherein the fuselage comprises aerodynamic stabilizer fin means.

21. Aircraft comprising: an elongated fuselage, universally mounted pivot means forward of said fuselage, means for controlling the inclination of the axis of said pivot with respect to the longitudinal axis of said fuselage, means for supporting said pivot means on said fuselage for sliding movement relatively thereto, stop means between said fuselage and said pivot means for limiting said sliding movement, a tapering nose supported on said pivot means, and substantially forming an extension of said fuselage, rotary wing blades supported on said nose and angularly equispaced about the centre axis thereof, means for expanding said blades and for retracting them along said nose and said fuselage, centering means respectively supported on said fuselage and on said nose and operative when said fuselage and said nose are in their adjacent condition and inoperative when said fuselage and said nose are in their spaced apart condition.

22. A flying machine comprising a fuselage, a nose extending forwardly from said fuselage, universal joint means supporting said nose on said fuselage, a rotary wing-structure supported on said nose and regularly arranged around the axis thereof, means for supporting said nose for lengthwise sliding movement with respect to said fuselage between a remote and a proximate position with respect thereto, means for maintaining said nose with the longitudinal axis thereof in alignment with the longitudinal axis of said fuselage when said nose is in said proximate position and inoperative when said nose is in its said remote position, and means for retracting said rotary wing structure along said nose and fuselage.

23. A flying machine which comprises: a forwardly-truncated fuselage, propelling means in said fuselage, a nose carried at the forward end of said fuselage and rotatable relatively thereto, and a rotary wing structure adapted for windmill action mounted on said nose and comprising blades and means for bringing said blades to an operative position transverse to the axis of said fuselage and for bringing said blades to an inoperative position retracted in folded condition along said fuselage.

24. A flying machine which comprises: a fuselage, a fin structure secured to said fuselage, a nose carried at the forward end of said fuselage, a rotary wing structure carried by said nose including blades, and means for folding each blade along the fuselage by rotation about an axis transverse to the long axis of said fuselage to render said rotary wing structure inoperative for horizontal flight of said machine and for expanding said wing structure by a reverse rotation of each one of said blades about said transverse axis to render said rotary wing structure operative effectively to slow down the rate of descent of said machine with its fuselage substantially vertical for landing.

References Cited in the file of this patent

UNITED STATES PATENTS

| Number | Name | Date |
|---|---|---|
| 1,788,218 | Wettstein | Jan. 6, 1931 |
| 1,880,586 | Tiling | Oct. 4, 1932 |
| 2,026,885 | Goddard | Jan. 7, 1936 |
| 2,043,704 | McPherren | June 9, 1936 |
| 2,052,086 | Dornier | Aug. 25, 1936 |
| 2,334,028 | Raio | Nov. 9, 1943 |
| 2,380,278 | Weissman | July 10, 1945 |
| 2,387,762 | Leonard | Oct. 30, 1945 |
| 2,437,789 | Robbins | Mar. 16, 1948 |

FOREIGN PATENTS

| Number | Country | Date |
|---|---|---|
| 864,212 | France | Jan. 13, 1941 |